3,216,797
PREPARATION OF BORON COMPOUNDS

Jawad H. Murib, St. Bernard, and Charles A. Bonecutter, Cincinnati, Ohio, assignors to National Distillers and Chemical Corporation, New York, N.Y., a corporation of Virginia
No Drawing. Filed July 14, 1958, Ser. No. 748,156
5 Claims. (Cl. 23—204)

The present invention relates to a novel catalytic method for preparation of boron hydrides and more particularly, to the synthesis of chloroboronhydride and boron hydrides by direct reduction of a boron trihalide, such as boron trichloride and boron tribromide, with hydrogen.

In accordance with this invention, a boron trihalide is subjected to contact with hydrogen in a vapor phase reaction at an elevated temperature in presence of a Group Ib metal whereby there is produced a markedly high yield of boron hydrides. For such a reaction, the boron trihalide is preferably boron trichloride but other trihalides such as boron trifluoride, boron tribromide and boron triiodide may be used. As to the amount of hydrogen for use in such a reaction, a substantially large excess of hydrogen is preferred. Thus, in mole ratio, the process embodied herein is preferably carried out with from about 3 to 15 moles of hydrogen per mole of the boron trihalide but more or less hydrogen, such as from about 1 to about 60 moles of hydrogen per mole of the boron trihalide can be used.

By carrying out the process embodied herein, and as compared to carrying out such a reaction but in absence of the Group Ib metal, there results at least one or a plurality of advantages including an increased percentage conversion per pass to the desired boron hydride at a much reduced residence time for contact of the hydrogen with the boron trihalide without sacrificing total yield of the desired product.

The reactants (i.e., the boron trihalide and hydrogen) are contacted for only a relatively short period of time sufficient to effect the desired conversion. In general, the contact is maintained for from about 0.01 to about 2.5 seconds with a preferred range being from about 0.02 to about 1.0 second. Longer contact times generally lead to lower yields and formation of undesirable by-products such as higher boron hydrides and metallic boron. The desired reaction may be carried out at substantially atmospheric pressure or, if desired, at superatmospheric pressure up to about 50 atmospheres.

As aforesaid, the process embodied herein is carried out in the vapor phase at an elevated temperature and generally, on the order of from above 250 to about 950° C. but, preferably, temperatures of from about 550 to 750° C. are used. Temperatures above 1000° C. generally lead to the formation of undesirable by-products, particularly boron metal. Thus, as to a preferred combination of reaction conditions for the process embodied herein, the boron trihalide is contacted with from about 3 to 15 moles of hydrogen per mole of the boron trihalide at a temperature of from about 550 to 750° C. for a period of from about 0.02 to 1.0 second.

As aforesaid, the process is carried out by contacting the boron trihalide with hydrogen in presence of a Group Ib metal and, for that purpose, copper and silver are suitable examples of such a metal. The amount of such a metal that is used for the reaction can be varied from relatively small to exceptionally large amounts such as from relatively small catalytic amounts based on the weight of the boron trihalide reactant or to large amounts as is the case when a bed of such a metal is used and through which the reactants are passed to undergo desired reaction in contact with the metal. Thus, for example, the amount of the Group Ib metal may be used in amounts as small as a fraction of one percent, such as 0.1%, based on the weight of the boron trihalide reactant, to large amounts which, as aforesaid, are on the order of those resulting by use of a bed of the metal through which the reactants are passed and whereby only a small amount of the reactants is in contact with the Group Ib metal at any one time. As far as we are aware, the Group Ib metal functions in catalytic manner without substantial contamination or alteration whereby, as in passage of the reactants through a bed of the Group Ib metal, the Group Ib metal can be used for a substantially long period of time, or reused repeatedly for carrying out the desired reaction.

Illustrated by the use of boron trichloride or tribromide and hydrogen as the reactants, the reaction product of the reaction embodied herein comprises the corresponding halo boron hydrides and hydrogen halide as illustrated by the following reactions:

$$Bhal_3 + H_2 \rightleftharpoons HBhal_2 + Hhal$$
$$2Bhal_3 + 5H_2 \rightleftharpoons B_2H_5hal + 5Hhal$$

with the haloboronhydrides being subject to a reversible reaction to boron trihalide and diborane as per the following:

$$6HBhal_2 \rightleftharpoons 4Bhal_3 + B_2H_6$$
$$6B_2H_5hal \rightleftharpoons 2Bhal_3 + 5B_2H_6$$

Thus, the reaction mixture produced by the process described herein consists mainly of the haloboronhydrides, diborane, boron halide, hydrogen and hydrogen halide. The hydrogen can be separated by trapping the other components of the mixture at −196° C. in a liquid nitrogen trap as the hydrogen does not condense at such a temperature, the hydrogen halide volatilized by warming the mixture from about −120° C. to −107° C., and the diborane isolated by refluxing and volatilization at 0° C. under 2 atmospheres of pressure. As the diborane is removed, the equilibrium with haloboronhydrides as shown above is shifted to produce more diborane until substantially all the haloboronhydrides have been converted. The unreacted boron trihalide remaining in the residue is recycled to the hydrogen reaction step.

In order to further describe the invention, the following embodiments are set forth for purposes of illustration and not limitation.

A series of runs were made by bubbling hydrogen gas at atmospheric pressure through liquid boron trichloride or tribromide at temperatures controlled in such a manner as to determine the resulting ratios of hydrogen to boron trihalide which entered the reactor consisting of a glass tube containing 40.6 grams of silver granules, or in the absence thereof, at various temperatures. The free volume of the reaction zone was 16 cc. The volatile reaction products were separated from hydrogen by condensation in U-tubes immersed in liquid nitrogen at −196° C. These products were analyzed by infrared spectra to estimate the hydrogen halide. The boron hydride content was determined by measurement of the hydrogen evolution on hydrolysis. The presence of diborane was substantiated by infrared spectra.

| Run No. | Residence Time, (sec.) | Temp., °C. | Ratio, $H_2/hal_3$ | Percent conversion per pass | Percent yield $B_2H_6$ (diborane) |
|---|---|---|---|---|---|
| 1 | 0.2 | 670 | 14 $H_2/BCl_3$ | 13.1 | 88.5 |
| 2 | 0.2 | 620 | 53 $H_2/BCl_3$ | 16.7 | 104.0 |
| 3 | [1] 0.2 | 620 | 14 $H_2/BCl_3$ | 15.0 | 98.4 |
| 4 | [1] 0.2 | 620 | 53 $H_2/BCl_3$ | 18.8 | 96.5 |
| 5 | [1] 0.4 | 620 | 53 $H_2/BCl_3$ | 17.5 | 96.4 |
| 6 | [2] 0.2 | 620 | 14 $H_2/BCl_3$ | 1.2 | |
| 7 | [2] 0.2 | 620 | 14 $H_2/BCl_3$ | 1.1 | |
| 8 | [1] 0.2 | 620 | 14 $H_2/BBr_3$ | 12.8 | 48.3 |

[1] The silver packing was irradiated with light.
[2] No catalyst was used.

In other runs, copper was used as the catalyst instead of silver. The following results were obtained when copper wire was used as packing, with a free volume of heated zone of 14 cm.³, at a ratio of $H_2/BCl_3$ of 14/1.

| Run No. | Temp., °C. | Residence Time (seconds) | Percent conversion [1] to $B_2H_6$ | Percent yield [2] of $B_2H_6$ |
|---|---|---|---|---|
| 1 | 530 | 0.2 | 8.7 | 91.4 |
| 2 | 620 | 0.2 | 10.7 | 71.4 |
| 3 | 720 | 0.2 | 10.7 | 40.7 |
| 4 | 570 | 0.11 | 9.1 | 98.8 |

[1] Conversion per pass.
[2] Based on $BCl_3$ reacted per pass.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A catalytic process for preparation of boron hydrides by direct reaction of a boron trihalide with hydrogen which comprises passing a mixture of a boron trihalide and hydrogen into contact with a catalytic amount of a Group Ib metal at from about 250 to about 950° C. for from about 0.01 to about 2.5 seconds to produce boron hydrides by direct reaction of the hydrogen and boron trihalide without substantial formation of the corresponding halide of said Group Ib metal, and continuing passage of such a mixture of boron trihalide and hydrogen into contact with said catalytic amount of Group Ib metal at said conditions of temperature and contact time until the amount of boron hydrides produced greatly exceeds the amount of boron hydride theoretically producible if said catalytic amount of Group Ib metal reacted with boron trihalide to produce the corresponding halide of said Group Ib metal in presence of hydrogen whereby there is produced a reaction mixture comprising essentially haloboronhydrides, diborane, boron halide, hydrogen, and hydrogen halide and containing no Group Ib metal halide.

2. A process, as defined in claim 1, wherein the trihalide of boron is contacted with the hydrogen for a period of from about 0.01 to about 1.0 seconds and the trihalide of boron is contacted with hydrogen in a ratio of from about 1 to about 60 moles of hydrogen per mole of the boron trihalide.

3. A process, as defined in claim 2, wherein the trihalide of boron is from the group consisting of boron trichloride and boron tribromide and the Group Ib metal is from the group consisting of copper and silver.

4. A process, as defined in claim 1, wherein the reaction product comprises diborane and the diborane is removed from the reaction product as it is formed.

5. A process, as defined in claim 1, wherein the catalytic reaction is carried out at from about 550 to about 750° C. for from about 0.02 to about 0.1 second with from about three to fifteen moles of hydrogen per mole or boron trichloride in presence of a metal mass from the groups consisting of silver and copper.

References Cited by the Examiner

UNITED STATES PATENTS 2,875,028   2/59   Wenternitz _____ 23—204 X

OTHER REFERENCES

Hodgman: "Handbook of Chemistry and Physics," 33rd edition, 1951–1952, page 1891.

Hurd: "Journal of The American Chemical Society," vol. 71, pages 20–22 (January 1949).

Schlesinger et al.: "Journal of the American Chemical Society," vol. 53, pages 4321–4332 (December 1931).

Taylor: "Inorganic and Theoretical Chemistry," 9th edition, 1952, pages 148–149.

Weintraub: "Industrial and Engineering Chemistry," vol. 3, pp. 299–301 (1911).

MAURICE A. BRINDISI, *Primary Examiner.*